(12) United States Patent
Jones et al.

(10) Patent No.: US 8,983,415 B2
(45) Date of Patent: Mar. 17, 2015

(54) ANTENNA SYSTEM MONITOR

(75) Inventors: Michael W. Jones, Warradale (AU); Lambertus A. M. Voskulen, Belair (AU)

(73) Assignee: RF Industries Pty Ltd, Seven Hills (AU)

( * ) Notice: Subject to any disclaimer, the term of this patent is extended or adjusted under 35 U.S.C. 154(b) by 230 days.

(21) Appl. No.: 13/227,643

(22) Filed: Sep. 8, 2011

(65) Prior Publication Data

US 2012/0071123 A1 Mar. 22, 2012

(51) Int. Cl.
*H04B 1/16* (2006.01)
*H04B 7/08* (2006.01)

(52) U.S. Cl.
CPC .................................. *H04B 7/0814* (2013.01)
USPC ........... 455/205; 455/209; 455/213; 455/121; 375/316

(58) Field of Classification Search
USPC .......... 455/150.1, 154.2, 155.1; 324/645, 629
See application file for complete search history.

(56) References Cited

U.S. PATENT DOCUMENTS

| 6,178,310 | B1* | 1/2001 | Jeong .......................... 455/67.11 |
| 8,340,218 | B2* | 12/2012 | Drennen, III ................. 375/316 |
| 2001/0024943 | A1* | 9/2001 | Welland ......................... 455/76 |
| 2002/0113601 | A1* | 8/2002 | Swank, II ..................... 324/637 |
| 2007/0200766 | A1* | 8/2007 | McKinzie et al. ..... 343/700 MS |
| 2010/0166112 | A1* | 7/2010 | Drennen, III ................. 375/316 |
| 2010/0231236 | A1* | 9/2010 | Harrison ....................... 324/645 |

OTHER PUBLICATIONS

E-mail transmittal dated Feb. 4, 2009, regarding ASM products.

* cited by examiner

*Primary Examiner* — Temesgh Ghebretinsae
*Assistant Examiner* — Richard Chan
(74) *Attorney, Agent, or Firm* — Norton Rose Fulbright US LLP

(57) ABSTRACT

A system is disclosed for monitoring of individual frequency channels in an RF signal band by configuration of the electronic processor to operate the tunable filter to select desired channel sub bands. Measurement of forward and/or reverse-propagating fields within the selected sub-bands may be performed and corresponding power levels recorded. The records may be used to provide monitoring signals, such as measures of forward and reflected power, as well as VSWR, return loss. Indications or alarms may be activated if any of these quantities, associated with any one or more channels, falls outside a predetermined acceptable operating range.

20 Claims, 6 Drawing Sheets

ANTENNA SYSTEM MONITOR

TECHNICAL FIELD

The present invention relates to monitoring the performance and operation of radio frequency (RF) transmission systems.

BACKGROUND

Radio frequency (RF) transmission is used in a wide range of communications applications. Without limitation, these applications include terrestrial trunked radio (TETRA), personal communications system (PCS), 3G, advanced mobile phone system (AMPS), broadcast, code division multiple access (CDMA), digital cellular system (DCS), government, general packet radio service (GPRS), global system for mobile communications (GSM), industrial, microwave, military, paging, public safety, rail, ultra-high frequency (UHF), utilities, very high frequency (VHF) and wideband CDMA (W-CDMA). Many of these systems involve the use of fixed transmitters and/or receivers, which may serve large numbers of users and operate at relatively high power levels. In some applications, such as public safety, high availability of the transmission system is essential. Accordingly, for commercial, technical and safety reasons it is desirable to incorporate appropriate monitoring devices within these systems, to enable changes in performance and/or failures of equipment to be identified and rectified quickly and safely.

While most modern high-power transmitters include internal voltage standing wave ratio (VSWR) monitoring and protection, these facilities are not generally suitable for ongoing monitoring of the health of the transmission system which might enable changes in performance to be detected early when they can be prevented from developing into more serious faults. It is therefore generally desirable to incorporate external monitoring devices, such as VSWR meters, at appropriate points within an RF transmission system. For example, monitoring devices may be installed along cables and at antennas.

Prior art monitoring devices such as, for example, the ACM series of antenna and cable monitors from Bird Technologies Group (www.birdtechnologies.com) provide many of these features. However, such prior art devices monitor the transmitted RF signal in its entirety, and are not capable of monitoring individual frequency channels within the signal. Accordingly, they are unable to detect changes in the performance of individual channels within the transmitted RF spectrum. Furthermore, a separate monitoring apparatus is required for each individual cable or antenna at a transmitter site, even where these cover different frequency bands. This results in a relatively high expense of installing a complete monitoring solution at a particular transmitter site.

BRIEF SUMMARY

According to one embodiment, an apparatus includes an RF forward input port and corresponding reverse input port receiving, in use, forward-propagating and reflected fields respectively, of a transmitter, within a predetermined bandwidth. The apparatus further includes at least one tunable filter having at least one tuning signal input and being configured to provide at an RF filter output a selected frequency sub-band from within the predetermined bandwidth provided at an RF filter input which is coupled to at least one of the forward and reverse input ports. The apparatus also includes an RF detector having an RF input port coupled to the RF filter output and configured to generate at a detector output an electronic signal corresponding with RF power received at the RF input port. The apparatus also includes an electronic processor comprising at least a tuning signal output coupled to the tuning signal input of the tunable filter, and a power signal input coupled to the detector output. The processor may be configured to selectively generate a tuning signal at the tuning signal output corresponding with one or more specified frequency sub-bands, to record RF power signals generated by the RF detector corresponding with RF signals received at the forward and reverse input ports within said specified frequency sub-bands, and to provide monitoring signals determined from said recorded RF power signals.

Accordingly, embodiments disclosed below may provide monitoring of individual frequency channels in an RF signal band, by configuration of the electronic processor to operate the tunable filter to select desired channel sub bands, whereby measurement of forward and/or reverse-propagating fields within the selected sub-bands may be performed and corresponding power levels recorded. The measurements may be used to provide monitoring signals, such as measures of forward and reflected power, as well as VSWR, return loss, and/or indications or alarms if any of these quantities, associated with any one or more channels, falls outside a predetermined acceptable operating range. The tunable filter may have a tunable center frequency and/or a tunable bandwidth.

In one embodiment, the apparatus comprises only a single tunable filter and a first RF switch having a switching input coupled to a first switch control output port of the processor, and configured to selectively couple the RF filter input of the tunable filter to the forward input port or the reverse input port, responsive to a first switch control signal generated by the processor.

The ability of the processor to switch the filtered and measured signal between the forward and reverse input ports may enable the power of RF fields propagating in both directions, and in individual channels, to be measured using a single filter and RF detector. In particular, the processor may first operate the RF switch to couple the forward-propagating field to the tunable filter and RF detector, perform a first power measurement, and then operate the first RF switch to couple the reverse-propagating field to the filter and detector, before taking a second power measurement. The forward and reverse power measurements may be output, and/or may be utilized in order to calculate further performance measures, such as VSWR or return loss.

According to another embodiment, the apparatus may include a plurality of forward input ports and corresponding reverse input ports, and first and second RF couplers configured to combine fields received at the forward input ports and reverse input ports respectively. For example, four forward input ports and four reverse input ports may be included in the apparatus in which each pair may be coupled to a separate transmission cable or antenna. At a transmission site, a number of antennas may be provided, each of which covers a different frequency band. By combining monitoring signals from each antenna in such an arrangement within the monitoring apparatus, and prior to coupling of the combined signals into the tunable filter, a single monitoring apparatus may be shared amongst, for example, four antennas. This may reduce the cost of installing appropriate monitoring within the transmitter site.

In another embodiment, the apparatus further comprises a receiver input port receiving in use, an RF field received by a receiving antenna, and a second RF switch having a switching input coupled to a second switch control output port of the processor, and configured to selectively couple the RF filter of the tunable filter to the receiver input port or to at least one of the forward and reverse input ports, responsive to a second switch control signal generated by the processor.

In this embodiment, the same single filter and RF detector may be selectively employed to monitor a received power signal, which may be either an active channel or a pilot tone intentionally injected into a corresponding transmitted signal for this purpose. This may allow monitoring the overall system transmission performance and/or the receiver performance.

The apparatus may further include an RF synthesizer having an RF output providing a continuous-wave RF field at a frequency determined by a signal applied to a frequency control input, wherein the RF output is coupled to the RF reverse input port, and wherein the frequency control input is coupled to a frequency control output of the processor. This arrangement may allow the same single monitoring device to inject an RF pilot tone at a selected frequency, determined by the frequency control output generated by the processor, into the transmitted signal. This may be used, for example, in combination with the receiver input port described above, in order to perform end-to-end monitoring of the transmission system.

The monitoring signals provided by the processor may include one or more alarm signals and/or channel status information signals. Channel status information signals may include one or more of transmitted forward channel power level, reflected channel power level, and channel VSWR. Alarm signals may include one or more of low channel-power alarms, high channel-power alarms, and excessive channel-VSWR alarms. When the receiver input port is employed, the monitoring signals may further include one or more of a low received power alarms and received power level status information signals.

According to a further embodiment, the processor includes a microprocessor coupled to at least one memory device. The processor also includes at least one input/output interface coupled to the microprocessor. The processor further includes a tuning signal output coupled to the microprocessor and the tuning signal input of the tunable filter. The processor also includes an RF power input coupled to the microprocessor and to the RF detector output. The memory device may include instructions executable by the microprocessor to cause the processor to execute the step of generating a tuning signal output corresponding with a selected frequency sub-band. The instructions may also cause the processor to receive an RF power input signal corresponding with RF power of at least one selected RF input signal within the selected frequency sub band. The instructions may also cause the processor to compute at least one monitoring signal value based upon said RF power input signal. The instructions may also cause the processor to generate at least one monitoring signal value output via the input/output interface.

In further embodiments, the at least one input/output interface may include an indicator lamp or LED, a visual display panel, a network interface, a serial port interface, and/or an alarm signal interface.

According to one embodiment, a method includes tuning a selected frequency sub-band having a center frequency and a bandwidth from an input signal received from a transmitter. The step of tuning includes selecting a first frequency sub-band for a first filter by selecting a first frequency for a first radio frequency (RF) synthesizer of the first filter. The step of tuning further includes selecting a second frequency sub-band for a second filter by selecting a second frequency, different from the first frequency, for a second RF synthesizer of the second filter, such that the second frequency sub-band at least partially overlaps the first frequency sub-band. The step of tuning also includes mixing an output of the first filter and the second filter to obtain the selected frequency sub-band. The method also includes generating a detector output corresponding to radio frequency (RF) power in the selected frequency sub-band of the received input signal. The method further includes recording the detector output for the selected frequency sub-band.

In further embodiments, the method also includes switching the received input signal between a RF forward input port and a RF reverse input port in which generating a detector output corresponding to RF power in the selected frequency sub-band of the received input signal comprises generating a detector output corresponding to RF forward power in the selected frequency sub-band of the received input signal and generating a detector output corresponding to RF reverse power in the selected frequency sub-band of the received input signal. The method may include tuning a second selected frequency sub-band of the received input signal and recording the detector output for the second selected frequency sub-band. The method may include generating a monitoring signal from the detector output. The method may include generating at least one of a transmitted forward channel power level signal, a reflected channel power level signal, and a channel voltage standing wave ratio (VSWR) signal. The method may include synthesizing a continuous-wave RF field at a first frequency on the input signal.

According to another embodiment, an apparatus includes a tunable filter having a tuning signal input, a radio frequency (RF) filter input, and an RF filter output. The tunable filter passes a first frequency sub-band, selected by the tuning signal input, from the RF filter input to the RF filter output. The tunable filter includes a first RF synthesizer coupled to a first filter and a second RF synthesizer coupled to a second filter. The first filter is coupled to the second filter. The apparatus also includes an RF detector comprising a detector input port coupled to the RF filter output and comprising a detector output port, in which the RF detector generates a detector output corresponding to RF power received at the detector input port. The apparatus further includes a processor comprising a tuning signal output coupled to the tuning signal input of the tunable filter and comprising a power signal input coupled to the detector output of the RF detector. The processor is configured to generate on the tuning signal output a signal corresponding to the first frequency sub-band and to record the detector output corresponding to RF power in the first frequency sub-band.

In further embodiments, the apparatus includes a RF forward input port, a RF reverse input port, and a switch having a first switched input coupled to the RF forward input port, a second switched input coupled to the RF reverse input port, and a switched output coupled to the RF filter input. The switch couples the RF filter input to at least one of the RF forward input port and the RF reverse input port. The apparatus may include an RF synthesizer having an RF output coupled to the RF reverse input port, in which the RF synthesizer generates a continuous-wave RF field at a first frequency on the RF output. The apparatus may include a plurality of RF forward input ports, a plurality of RF reverse input ports, a first RF coupler coupled to the plurality of RF forward input ports, in which the first RF coupler combines fields received on each of the plurality of RF forward input ports to generate a first coupler output, a second RF coupler coupled to the plurality of RF reverse input ports, in which the second RF coupler combines fields received on each of the plurality of RF reverse input ports to generate a second coupler output, and a switch comprising a switched first input coupled to the first coupler output, a second switched input coupled to the second coupler output, and a switched output coupled to the RF filter input, in which the switch couples the RF filter input to at least one of the first coupler output and the second coupled output. The processor may be configured to generate a monitoring signal based, in part, on the recorded detector output. The processor may be configured to generate at least one of a low channel-power alarm, a high channel-power alarm, and an excessive channel-voltage standing wave ratio (VSWR) alarm. The processor may be configured to generate a tuning signal corresponding to a second frequency sub-band and to record the detector output corresponding to the second frequency sub-band. The processor may be configured to select a first frequency for the first RF synthesizer to select a first filter frequency sub-band for the first filter and to select a second frequency for the second RF synthesizer to select a second filter frequency sub-band for the second filter, the second frequency different from the first frequency and selected such that the second filter frequency sub-band at least partially overlaps the first filter frequency sub-band.

According to a further embodiment, a computer program product includes a non-transitory computer-readable medium having code to generate a tuning signal output corresponding with a selected frequency sub-band, code to generate a first synthesizer tuning signal to select a first frequency for a first RF synthesizer, code to generate a second synthesizer tuning signal to select a second frequency for a second RF synthesizer different from the first frequency, code to receive an RF power input signal corresponding to an RF power of at least one RF signal input within the selected frequency sub-band, code to compute at least one monitoring signal value based, at least in part, upon the RF power input signal, and code to generate at least one monitoring signal value output.

In further embodiments, the computer program product may include code to generate at least one monitoring signal value output on at least one of an indicator lamp, a visual display panel, a network interface, a serial port interface, and an alarm signal interface.

The foregoing has outlined rather broadly the features and technical advantages of the present disclosed embodiments in order that the detailed description of the disclosed embodiments that follows may be better understood. Additional features and advantages of the disclosed embodiments will be described hereinafter which form the subject of the claims of the disclosed embodiments. It should be appreciated by those skilled in the art that the conception and specific embodiment disclosed may be readily utilized as a basis for modifying or designing other structures for carrying out the same purposes of the present disclosed embodiments. It should also be realized by those skilled in the art that such equivalent constructions do not depart from the spirit and scope of the disclosed embodiments as set forth in the appended claims. The novel features which are believed to be characteristic of the disclosed embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosed embodiments.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
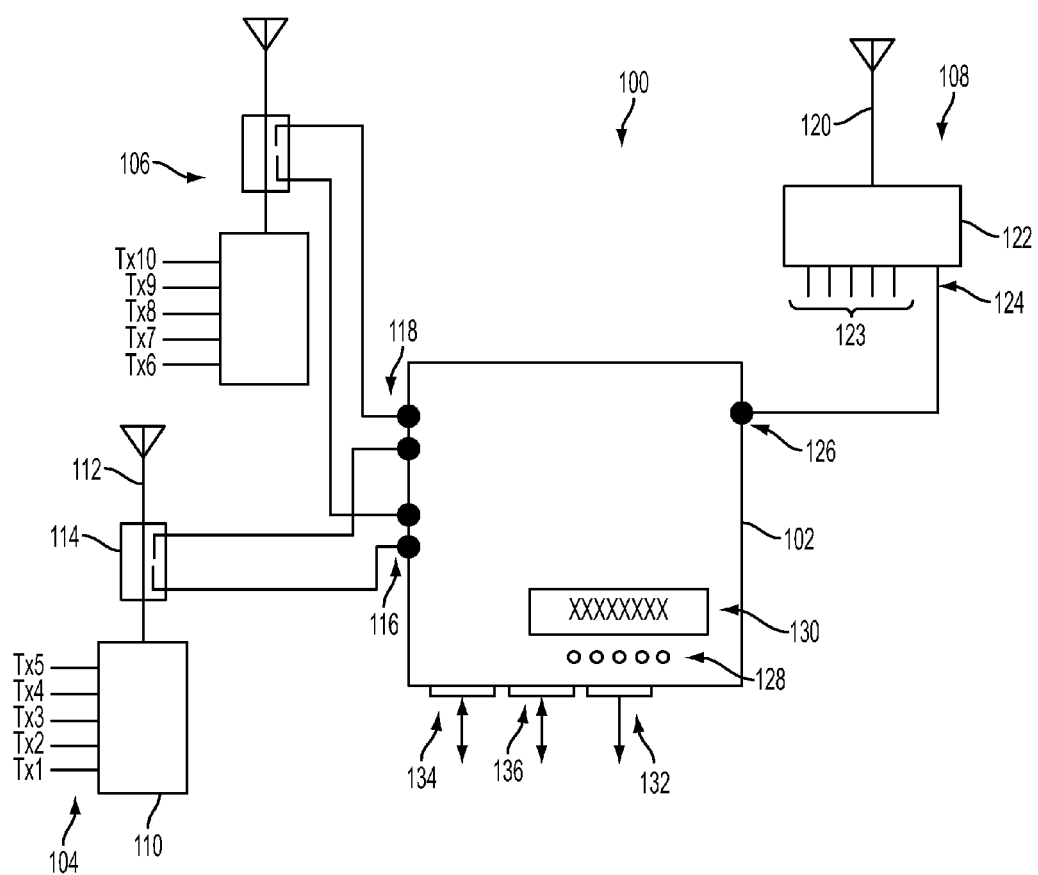
FIG. 1 is a block diagram, illustrating a portion of a wireless RF transmission system according to one embodiment of the disclosure.
Figure 2A:
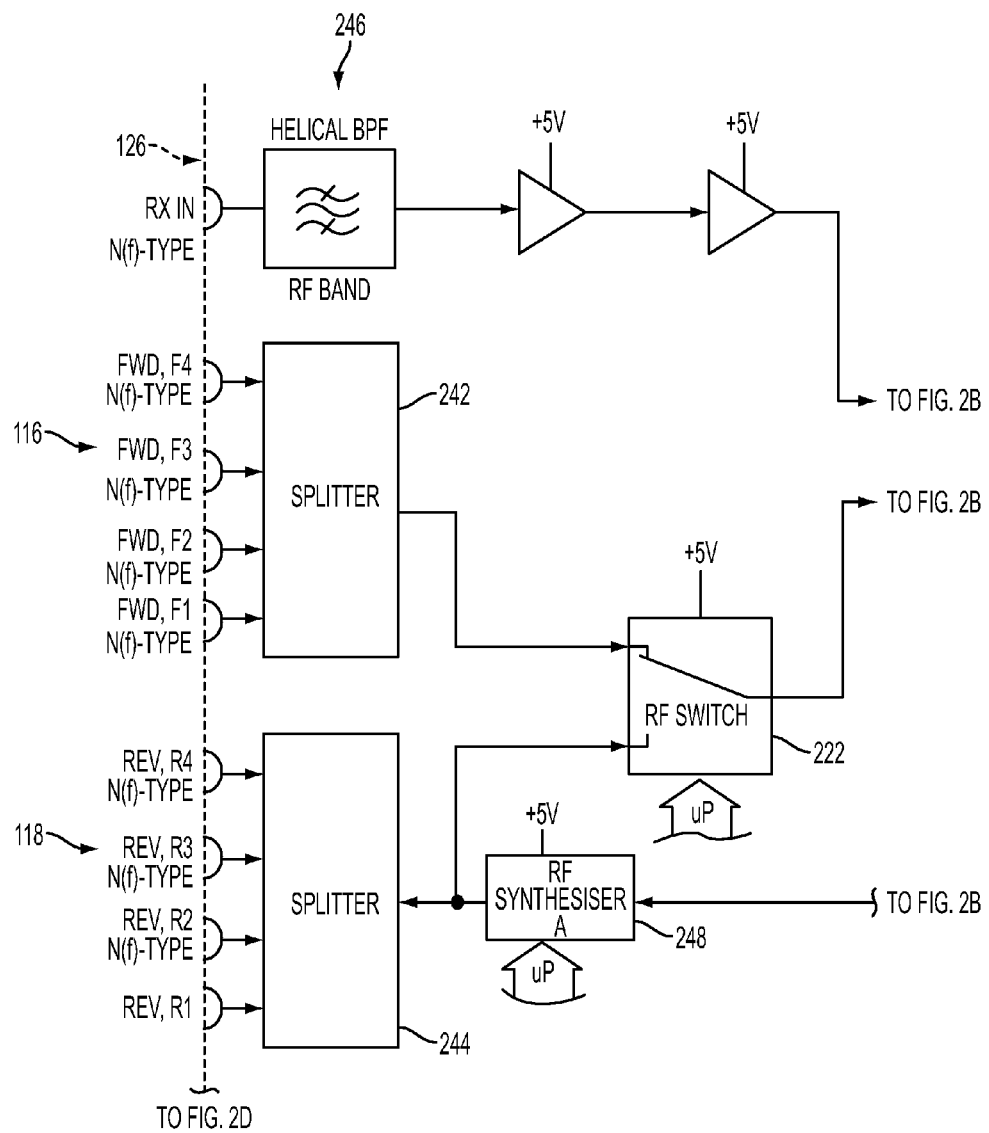
FIG. 2 is a block diagram illustrating of an RF monitoring apparatus according to one embodiment of the disclosure.
Figure 2B:
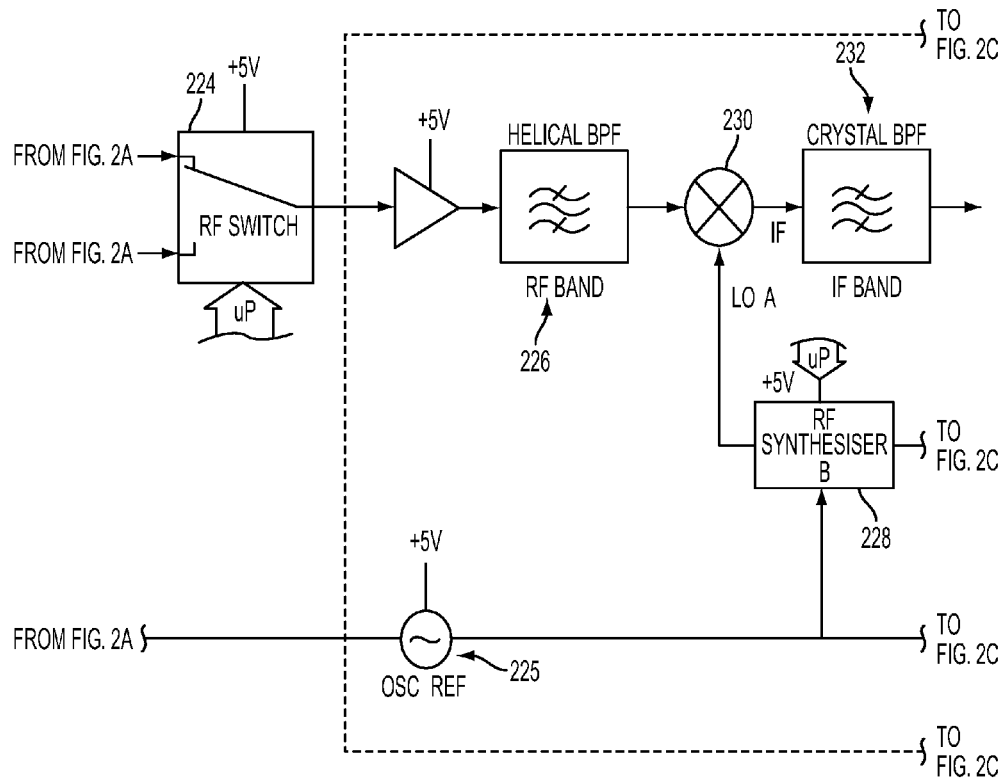
Figure 2B:
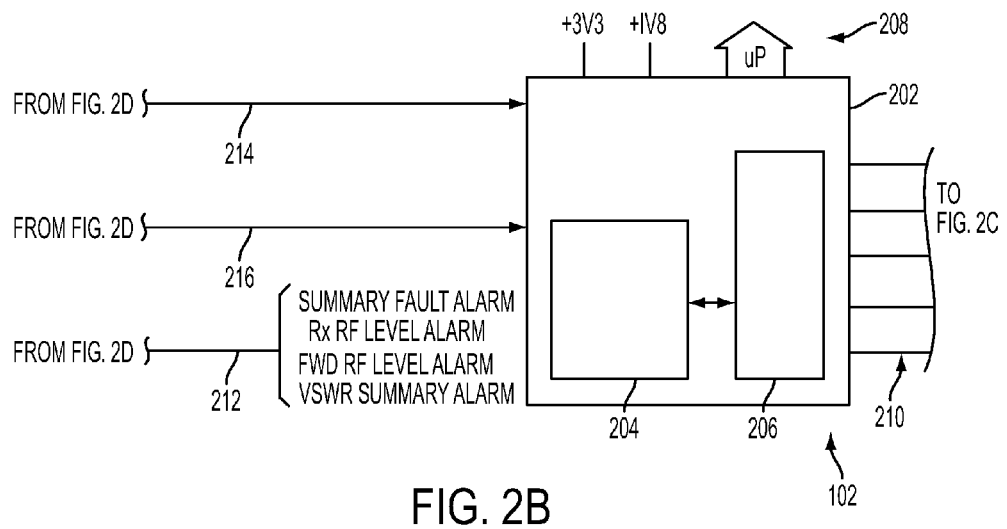
Figure 2C:
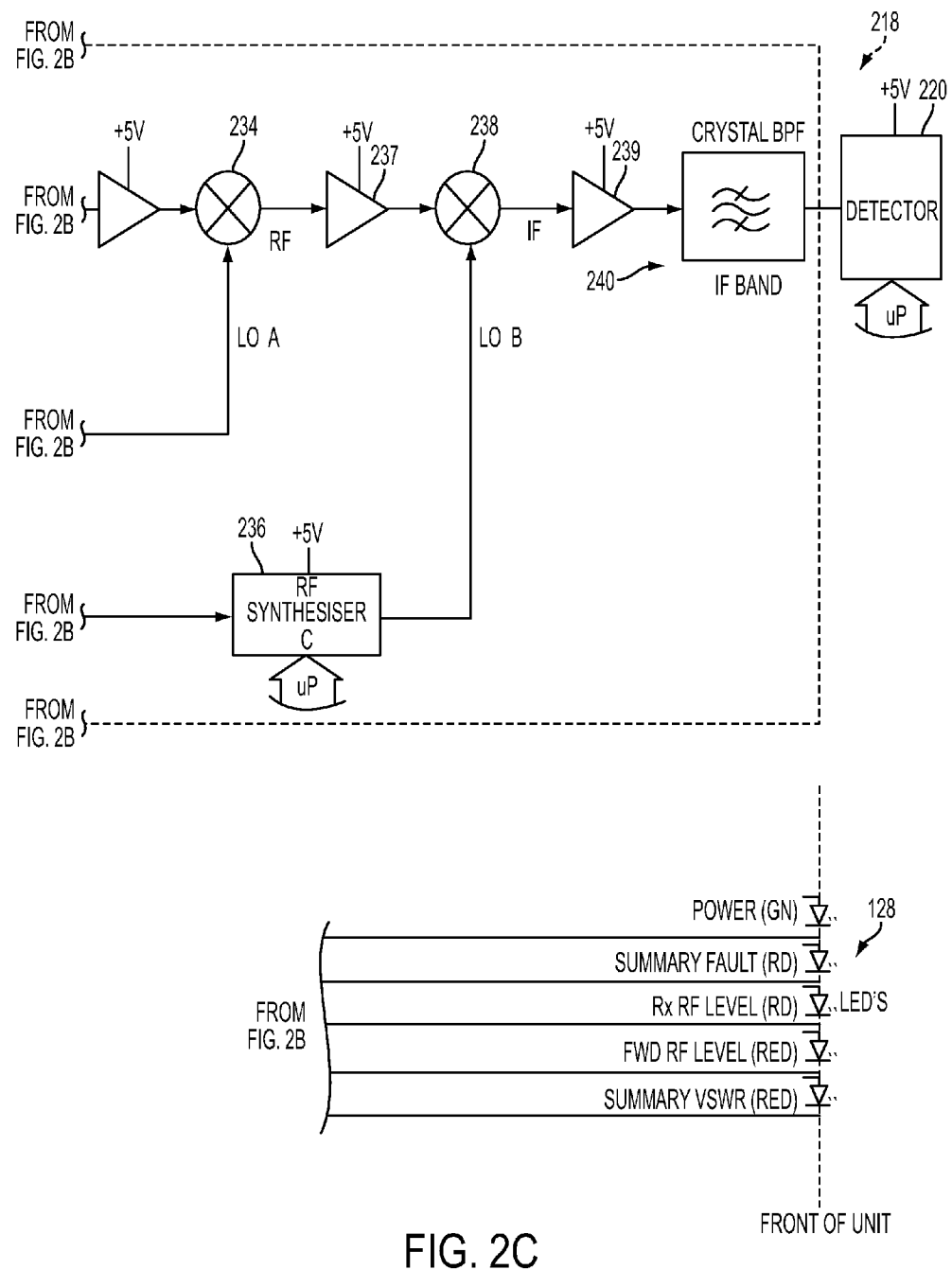
Figure 2D:
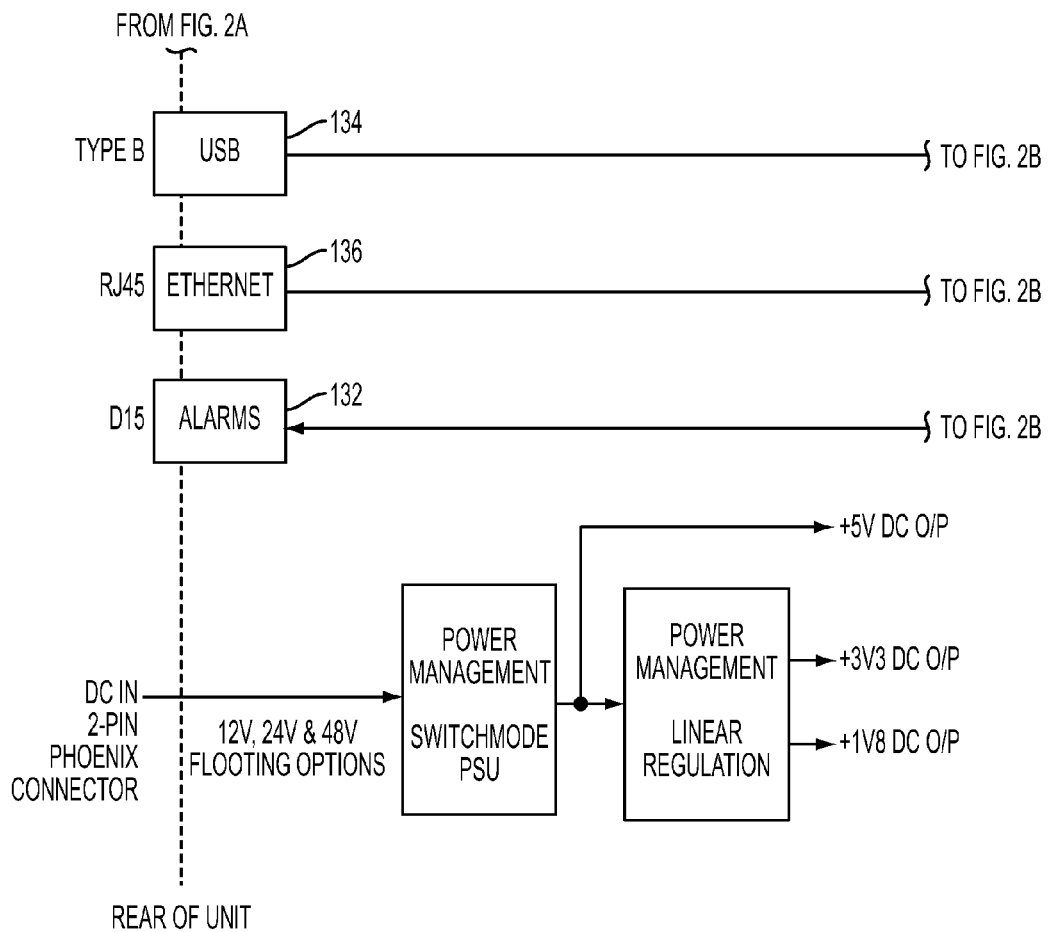

FIG. 1 is a block diagram illustrating a portion of an RF wireless transmission system 100 incorporating a monitoring apparatus 102. The system 100 includes one or more transmitting antenna units 104, 106. The exemplary system 100 also includes a receiving antenna unit 108. Each transmitting antenna unit 104 may include a transmitter combiner 110, which combines a plurality of transmitted channels having different carrier frequencies for transmission via a single antenna 112. To facilitate monitoring of the transmitted signal by the apparatus 102, a directional coupler 114 may be installed at the antenna 112 for monitoring both forward-propagating and reflected RF fields. Each forward-propagating coupler output may be coupled to a corresponding forward input port 116 of the monitoring apparatus 102, while each reflected field monitoring port may be coupled to a corresponding reverse input port 118. That is, the directional couplers of each transmitting antenna unit 104, 106 may be coupled to a corresponding pair of forward and reverse input ports of the monitoring apparatus 102.

The receiving antenna unit 108 may include a receiving antenna 120 and a receiver multi-coupler 122. Outputs 123 of the multi-coupler may be coupled to corresponding receivers (not shown) for detecting and demodulating separate received RF channels. A further output port 124 of the multi-coupler 122 may be coupled to a corresponding receiver input port 126 of the monitoring apparatus 102.

According to one embodiment, the apparatus 102 may include indicator lamps or light emitting diodes (LEDs) 128, a display panel 130, an alarm output port 132, a computer peripheral interface port 134 (such as a universal serial bus (USB) port), and/or a network interface port 136 (such as an Ethernet or other local area network (LAN) port, e.g., an RJ-45 connector). A variety of alternative input/output or data communications ports, may also be included in the apparatus 102.

A block diagram illustrating the internal circuitry of an exemplary monitoring apparatus 102 is shown in FIG. 2. The monitor 102 may include an electronic processor 202, which comprises a central processing unit (CPU) 204 and an associated memory device 206. The CPU 204 and memory 206 may be integrated into a single microcontroller device, or may be separate components coupled together in a conventional manner. The memory 206 may include volatile memory locations, non-volatile memory locations, or a combination of both, for storing static data, transient data, and/or program instructions associated with the operation of the processor 202. In particular, the memory 206 may include program instructions executable by the CPU 204 to implement relevant features of the monitoring apparatus 102. For example, the instructions may allow the apparatus to monitor and log the percentage usage of individual transmitters using a sliding average, which is indicative of the data cycle. In another example, the apparatus may record a snapshot of each individual transmitter power level (e.g., every 30 seconds) and store the snapshots in memory allowing a graphical representation of the transmitter power performance over time to be displayed in an histogram chart.

The processor 202 may also include electronic control and data lines, such as a bus 208 coupled to various other components of the monitoring apparatus 102, as shown in FIG. 2. Digital output signals 210 may be coupled to corresponding front panel indicator LEDs 128. A set of alarm signals 212 may also be provided from the processor 202 to a back panel alarm signal port 132, which may include a standard connector, such as a D-15 connector. A network interface connection 216 may also be provided between the processor 202 and a corresponding network port 136, such as an RJ-45 connector. A local communications signal line 214, such as a USB peripheral interface, may also be provided between the processor 202 and a corresponding back panel connector 134.

The monitoring apparatus 102 may include a tunable filter 218 to receive selected signals from the input ports 116, 118, 126, and to select specified frequency sub-bands which are output to RF detector 220. The detector 220 may measure the power in the signal provided from the tunable filter 218 at its RF input port and generate a corresponding output signal corresponding with the detected power that is transmitted to the processor 102 via the signal bus 208.

The monitoring apparatus 102 may be configured such that a single tunable filter 218 may be shared between multiple input ports. In particular, a first RF switch 222 may be provided having a switching input controllable via the signal bus 208 of the processor 202. The switch 222 may select between forward input ports 116 and reverse input ports 118. The output of RF switch 222 may be a signal, or combination of signals, comprising samples of either forward-propagating fields of the antennas 112 or reverse propagating (e.g., reflected) fields. The processor 202 may switch between measurements of forward and reflected fields.

A second RF switch 224 may be provided, which is configured to switch between the transmitted field ports 116, 118 and the receiver monitoring port 126. The second switch 224 may also be controllable by the processor 202 via the signal bus 208. Accordingly, by appropriate operation of the first and second switches 222, 224, the processor 202 may be able to select any one of the forward transmitted field 116, reflected transmitted field 118, and received signal 126 input ports, signals from which are applied to the input of the tunable filter 218.

Tuning of the tunable filter 218 may be performed by the processor 202 via the signal bus 208, based upon a reference oscillator 225 and two computer-controlled RF synthesizers 228, 236 that are referenced to the oscillator 225. According to one embodiment, the tunable filter 218 may include a first fixed RF filter 226 having a predetermined center frequency and bandwidth corresponding with the frequency band within which the RF transmission system 100 operates. Thus, the first RF filter 226, which may be, for example, a helical bandpass filter, rejects any signals outside this predetermined operating bandwidth.

An RF synthesizer 228 may generate a continuous-wave (CW) RF signal having a frequency determined under control of the processor 202. This CW signal may be mixed with the output of the first filter 226 in RF mixer 230, resulting in down conversion of the filter input signal to an intermediate frequency (IF) band. A narrow bandpass filter 232 corresponding with a frequency sub-band (e.g., a single-channel bandwidth or a plurality of channel bandwidths) within the IF band selects a corresponding sub-band from the IF signal. Accordingly, by appropriate selection of the output signal from the RF synthesizer 228, a sub-band at any desired frequency within the filter input may be selected. A second RF mixer 234 mixes the selected sub-band signal with the CW output of the synthesizer 228 resulting in an RF signal that may include only the selected sub-band.

The synthesizer 228, mixers 230, 234, and the bandpass filter 232 (which may be, for example, a crystal filter) enable the selection of any sub-band, such as an individual frequency channel, from the complete received signal band. This signal may be input directly to an RF detector in order to measure its corresponding power. According to one embodiment, additional amplification and/or other signal conditioning may be provided in order to ensure that the input to the RF detector 220 lies within an optimum operating range. According to one embodiment, apparatus 102 may include amplifiers 237, 239 and a narrowband filter 240, such as another crystal bandpass filter, to reject unwanted noise introduced by the amplifiers. The filter 240 may have a fixed center frequency, while the output from the mixer 234 has a variable center frequency, depending upon the selected sub-band. A second RF synthesizer 236 and corresponding mixer 238 may be provided to downconvert the selected RF signal to a fixed IF signal frequency corresponding with the bandpass filter 240. The output frequency of the RF synthesizer 236 may be referenced to the same oscillator 225 as the first synthesizer 228 and may be operated under control of the processor 202 via the signal bus 208.

The second IF bandpass filter 240 may have the same, or different, bandwidth and center frequency to those of the first IF filter 232. According to one embodiment, the bandwidth of both IF filters 232, 240 may be greater than the narrowest channel bandwidth of interest. By selecting different frequencies for the RF synthesizers 228, 236, each of the IF filters cover a different sub-band of the overall RF spectrum. Selectively overlapping these sub-bands may allow the two IF filters 232, 240 to provide a variable-width sliding window within the frequency domain. Thus, the tunable filter 218 may be tunable in both center frequency and bandwidth.

The processor 202 may be able to control which of the input signals (e.g., transmitted forward or reverse fields 116, 118 or received signal 126) are input to the tunable filter 218, and which sub-band or individual frequency channel is output from the filter 218 to the RF detector 220. The processor 202 may have full control over the measurement of power in any individual frequency channel, or other sub-band, monitored at any of the transmitter units 104, 106 or at the receiver unit 108.

According to one embodiment for use in the 746-870 MHz band, the helical filters 226, 246 have a center frequency of 808 Mhz and a bandwidth of 124 MHz, while the crystal filters 232, 240 have a center frequency of 90 MHz and a bandwidth of 20 kHz. However, other embodiments may be configured for use in different RF bands.

The apparatus 102 may also include couplers 242, 244 and the bandpass filter 246. The couplers 242, 244 may combine the forward and reverse fields, respectively, sampled at each transmit antenna unit 104, 106. When each transmitter operates within a different frequency range within the overall system bandwidth, no additional filtering may be required. On a receiving side, a filter 246, which may be a further helical bandpass filter, may be used to reject frequencies outside the operating system bandwidth, such as noise and unwanted signals that may be picked up by the receive antenna 120.

The apparatus 102 may further include RF synthesizer 248, which may be operable by the processor 202 via the signal bus 208. The RF synthesizer may generate a CW signal referenced to the oscillator 225 that is injected via the coupler 244 (operating in reverse as a splitter) to the transmit antennas 112. The CW signal may be transmitted and received at a remote site via a corresponding receiving antenna unit 108. The processor 202 may be able to select a pilot tone frequency, which may be any unused frequency within the system bandwidth, to transmit and use at a similar monitoring apparatus 102 at the receiving end in order to monitor the end-to-end performance of the transmission system at the pilot tone frequency.

The apparatus 102 provides a number of advantages over prior art monitoring devices. First, it is highly flexible and may be used to monitor individual frequency channels, without installation of multiple monitoring devices. Furthermore, it may be able to provide such monitoring for multiple transmit antennas simultaneously. It may also monitor received signal power, in one or more active channels, and/or end-to-end transmission performance via a CW tone that may be injected at any desired frequency within the operating bandwidth of the system 100. A single tunable filter 218 and RF detector 220 may be included in a single unit between multiple transmit antenna units and a receive antenna unit at each site. Software control may be achieved via a programmable processor 202, which also provides a variety of convenient interfaces for accessing monitoring signals including alarm signals and/or channel status information signals. For example, channel status information signals may include transmitted forward channel power levels, reflected channel power levels, and channel VSWR. These may be monitored over time, in order to detect changes or degradation in channel performance. Alarm signals may include signals such as low channel-power alarms, high channel-power alarms, and excessive channel-VSWR alarms.

Figure 3:
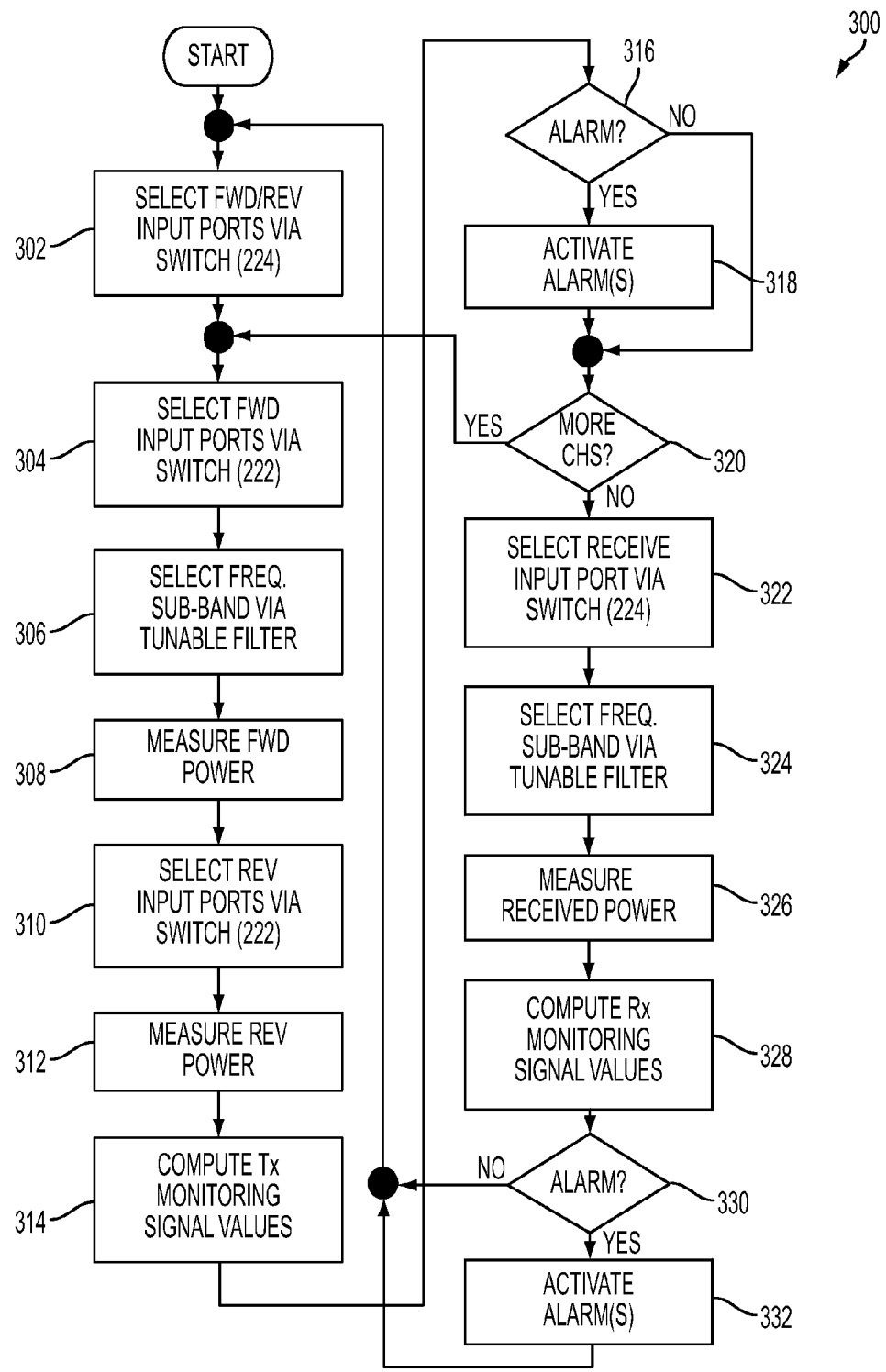
FIG. 3 is a flowchart illustrating a method of continuous monitoring according to one embodiment of the disclosure.

According to one embodiment, the processor 202 may be configured to perform a monitoring operation as described with reference to the flowchart 300 shown in FIG. 3. Although the processor may be programmed for continuous monitoring as described in FIG. 3, the processor may be programmed to perform other processes. For example, any number of received signal channels may be monitored, or selected subsets of transmitted channels may be monitored, or any of the monitoring functions described in the process 300 may optionally be included or omitted. Additionally, the order in which various operations are performed within the exemplary process 300 may be changed.

At step 302, the processor operates the second switch 224 in order to select the forward or reverse port signals output from the first switch 222. As described below, the processor 202 may select transmitted signals for measurement. Steps 304 to 320 include the measurement of signals present at the transmit antenna units, e.g., 104, 106.

At step 304, the processor 202 selects the forward input ports output from the coupler 242 via the first RF switch 222. The processor 202 selects a desired frequency sub-band or channel via the tunable filter 218, at step 306. At step 308 the processor 202 samples the power output signal from the RF detector 220, thereby measuring the corresponding channel forward power at the transmit antenna. This power measurement may be stored in memory 206.

At step 310, the processor 202 operates the first switch 222 to select the reflected fields output from the coupler 244. The processor 202 may samples the output of the RF detector 220, to obtain a measurement of the reflected power in the selected channel at the transmit antenna at step 312. This measured power value may be stored in memory 206.

At step 314, appropriate monitoring signal values, such as forward power, reverse power, and/or VSWR, are computed. Computed values may be stored in memory 206, which may retain a number of historical values for ongoing performance monitoring purposes.

At decision step 316 the computed monitoring signal values are compared with relevant alarm limits. For example, the forward power may be compared with a minimum acceptable transmitted power level, and the reverse power may be compared with a maximum acceptable reflected power value. Alternatively or additionally, the VSWR may be compared with a maximum acceptable value. If any relevant alarm levels that may be set have been exceeded, then control passes to step 318, at which the processor 202 activates the relevant alarm signals. This may include lighting one or more of the LEDs 128 and/or activating corresponding alarm lines at the alarm interface 132. Additionally, the existence of the alarm conditions may be recorded within the memory 206, along with the computed monitoring signal values.

At step 320 the processor 202 determines whether there are additional transmitted channel frequencies to be monitored. If so, then a new frequency is selected, and control returns to step 304, at which the transmitter monitoring process recommences, with selecting the new frequency channel at step 306. Once all channels have been monitored on the transmit side, control passes to step 322.

At step 322, the processor 222 operates the second RF switch 224 in order to select the receiving input port signal output from the bandpass filter 246. At step 324, the processor 202 operates the tunable filter 218 in order to select a desired frequency sub-band or channel at the receiver. The corresponding received signal power is detected by the RF detector 220, the output of which is sampled by the processor 202 thereby measuring the received channel power at step 326.

At step 328, relevant receiver monitoring signal values are computed. In one exemplary application, the processor 202 at a remote transmitting station operates the RF synthesizer 248 in order to select an output CW signal tone to be used for end-to-end performance monitoring. It is then possible at the receiving end to compute a receiver monitoring signal value comprising a total system transmission loss at this monitoring frequency. Alternatively, or additionally, the power in one or more active received channels may be monitored.

At step 330, it is determined whether alarm conditions have been reached for the computed signal values at step 328. If alarm conditions have been met or exceeded then one or more alarms are activated at step 332, otherwise step 304 is returned to. After the alarms are set at step 332, step 304 is returned to.

In addition to the monitoring functions exemplified by the foregoing description, the monitoring apparatus 102 may provide a number of additional features via the interface ports 132, 134, 136. For example, a conventional personal computer (PC), or a portable computing device (such as a notebook or tablet PC) may be coupled to the apparatus 102 via the USB port 134. The connected PC may communicate with the processor 202 and may request current and/or historical monitoring data that has been stored in the processor memory 206. Once uploaded to the PC, this data may be presented to a user, for example, on a "dashboard" display which may display current monitored power levels, VSWR values, alarm indications, and/or other information. Historical values may be shown, for example, in the form of graphs over time. Alternatively or additionally, uploaded data may be stored to a file on the PC, for subsequent review and processing, such as by a spreadsheet application or similar program.

The network interface 136 may be used to provide remote access, for example, via the Internet to the monitoring apparatus 102. Features provided via remote access may include one or more of the local features available via the USB port. Additionally or alternatively, the processor 202 may be programmed to implement a web server application enabling access to the apparatus 102 via a web browser. The processor 202 may therefore be configured to provide current and/or historical information by serving corresponding web pages to the remote browser application. Such a web interface may also allow download of data via a browser interface and/or the installation of software upgrades within the processor 202.

The alarm interface 132 may provide simple and direct access to a number of alarm signals. As shown in FIG. 2, these include a summary fault alarm, a receiver RF level alarm, a forward RF level alarm, and/or a VSWR summary alarm. Activation of any of these alarms may indicate a potential safety issue, or the possibility of damage to equipment at the transmitter site. Certainly, activation of an alarm may require prompt operator intervention. The alarm signals available at the alarm port 132 may be used to activate external alarm or warning indicators, including visual indicators (such as lamps) or audible indicators such as buzzers or sirens. According to one embodiment, alarm signals available from the alarm interface port 132 may be used to activate appropriate safety interlock systems. For example, transmitters may be disabled in the event the VSWR summary alarm is activated, which may indicate a potentially hazardous or damaging fault.

In one embodiment of the monitoring apparatus 102, actual receiver sensitivity measurements may be made at a site, which could be used to determine degradation in ongoing site performance due to the presence of noise or interference. Instead of injecting a constant, fixed level CW signal into the transmit antenna, a modulated signal with variable output power is injected instead, and picked up via the receiver port 126. A receiver built into the apparatus 102 may demodulate the signal and may be used to measure the 12 dB signal-to-noise and distortion ratio (SINAD) (analog) or 5% bit error rate (BER) (digital) signal level thresholds. Any degradation over time would indicate the presence of noise or interference.

As will be appreciated from the foregoing description, the configuration of the monitoring apparatus 102 and the provision of programmable processor 202, provides a very high degree of flexibility and adaptability, such as through software modifications to implement desired new features. For example, the USB interface 134 may be used to provide software updates to the processor 202. Accordingly, new functionality bug fixes, and/or software upgrades may be implemented within the monitoring apparatus 102. According to one embodiment, the processor 202 may be programmed to monitor and log the percentage usage of individual transmitters using a sliding average to indicate duty cycle. In another embodiment, the processor 202 may be programmed to record a snapshot of each individual transmitter power level (e.g., once every thirty seconds) and store the power level in memory. The power levels may be displayed on a graphical representation over time such as a histogram.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it will be appreciated by those skilled in the art that not all of the disclosed circuitry is required to practice the disclosure. Moreover, certain well known circuits have not been described, to maintain focus on the disclosure. Similarly, although the description refers to logical "0" and logical "1" in certain locations, one skilled in the art appreciates that the logical values can be switched, with the remainder of the circuit adjusted accordingly, without affecting operation of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   tuning a selected frequency sub-band having a center frequency and a bandwidth from an input signal received from a transmitter, in which tuning the selected frequency sub-band comprises:
   selecting a first frequency sub-band for a first filter by selecting a first frequency for a first radio frequency (RF) synthesizer to be mixed, with a first mixer, with a signal at the input of the first filter and to be mixed, with a third mixer, with the output of the first filter; and
   selecting a second frequency sub-band for a second filter by selecting a second frequency, different from the first frequency, for a second RF synthesizer to be mixed, with a second mixer, with a signal at the input of the second filter, such that the second frequency sub-band at least partially overlaps the first frequency sub-band;

generating a detector output corresponding to RF power in the selected frequency sub-band of the received input signal; and recording the detector output for the selected frequency sub-band.

2. The method of claim 1, further comprising:

switching the received input signal between a RF forward input port and a RF reverse input port, in which generating a detector output corresponding to RF power in the selected frequency sub-band of the received input signal comprises:

generating a detector output corresponding to RF forward power in the selected frequency sub-band of the received input signal; and generating a detector output corresponding to RF reverse power in the selected frequency sub-band of the received input signal.

3. The method of claim 1, further comprising:

tuning a second selected frequency sub-band of the received input signal; and recording the detector output for the second selected frequency sub-band.

4. The method of claim 1, further comprising generating a monitoring signal from the detector output.

5. The method of claim 4, in which generating the monitoring signal comprises generating at least one of an alarm signal and a channel status information signal.

6. The method of claim 5, in which generating a channel status information signal comprises generating at least one of a transmitted forward channel power level signal, a reflected channel power level signal, and a channel voltage standing wave ratio (VSWR) signal.

7. The method of claim 5, in which generating an alarm signal comprises generating at least one of a low channel-power alarm, a high channel-power alarm, and an excessive channel-voltage standing wave ratio (VSWR) alarm.

8. The method of claim 1, further comprising generating a continuous-wave RF field at a first frequency on the input signal.

9. An apparatus, comprising:

a tunable filter comprising a tuning signal input, a radio frequency (RF) filter input, and an RF filter output, in which the tunable filter passes a first frequency sub-band to the RF filter output, and the tunable filter comprises:

a first RF synthesizer coupled to a first mixer that is coupled to the input of a first filter and a third mixer that is coupled to the output of the first filter; and a second RF synthesizer coupled to a second mixer that is coupled to the input of a second filter;

in which the first filter is coupled the second filter through the third and second mixers;

an RF detector comprising a detector input port coupled to the RF filter output and comprising a detector output port, in which the RF detector generates a detector output corresponding to RF power received at the detector input port; and a processor comprising a tuning signal output coupled to the tuning signal input of the tunable filter and comprising a power signal input coupled to the detector output of the RF detector, in which the processor is configured:

to generate on the tuning signal output a signal corresponding to the first frequency sub-band; and to record the detector output corresponding to RF power in the first frequency sub-band.

10. The apparatus of claim 9, further comprising:

a RF forward input port;

a RF reverse input port; and a switch comprising a first switched input coupled to the RF forward input port, a second switched input coupled to the RF reverse input port, and a switched output coupled to the RF filter input, in which the switch couples the RF filter input to at least one of the RF forward input port and the RF reverse input port.

11. The apparatus of claim 10, further comprising an RF synthesizer having an RF output coupled to the RF reverse input port, in which the RF synthesizer generates a continuous-wave RF field at a first frequency on the RF output.

12. The apparatus of claim 9, further comprising:

a plurality of RF forward input ports;

a plurality of RF reverse input ports;

a first RF coupler coupled to the plurality of RF forward input ports, in which the first RF coupler combines fields received on each of the plurality of RF forward input ports to generate a first coupler output;

a second RF coupler coupled to the plurality of RF reverse input ports, in which the second RF coupler combines fields received on each of the plurality of RF reverse input ports to generate a second coupler output; and a switch comprising a switched first input coupled to the first coupler output, a second switched input coupled to the second coupler output, and a switched output coupled to the RF filter input, in which the switch couples the RF filter input to at least one of the first coupler output and the second coupled output.

13. The apparatus of claim 9, in which the processor is further configured to generate a monitoring signal based, in part, on the recorded detector output.

14. The apparatus of claim 13, in which the processor is further configured to generate at least one of an alarm signal and a channel status information signal.

15. The apparatus of claim 14, in which the processor is further configured to generate at least one of a low channel-power alarm, a high channel-power alarm, and an excessive channel-voltage standing wave ratio (VSWR) alarm.

16. The apparatus of claim 14, in which the processor is further configured to generate at least one of a transmitted forward channel power level signal, a reflected channel power level signal, and a channel-voltage standing wave ratio (VSWR) signal.

17. The apparatus of claim 9, in which the processor is further configured:

to generate a tuning signal corresponding to a second frequency sub-band; and to record the detector output corresponding to the second frequency sub-band.

18. The apparatus of claim 9, in which the processor is further configured:

to select a first frequency for the first RF synthesizer to select a first filter frequency sub-band for the first filter; and to select a second frequency for the second RF synthesizer to select a second filter frequency sub-band for the second filter, the second frequency different from the first frequency and selected such that the second filter frequency sub-band at least partially overlaps the first filter frequency sub-band.

19. A computer program product, comprising:

a non-transitory computer-readable medium comprising:

code to generate a tuning signal output corresponding to a selected frequency sub-band;

code to generate a first synthesizer tuning signal to select a first frequency for a first RF synthesizer, wherein the first frequency is mixed, with a first mixer, with a signal at an input of a first filter and mixed, with a third mixer, with an output of the first filter;

code to generate a second synthesizer tuning signal to select a second frequency for a second RF synthesizer different from the first frequency, wherein the second frequency is mixed, with a second mixer, with a signal at an input of a second filter;

code to receive an RF power input signal corresponding to an RF power of at least one RF signal input within the selected frequency sub-band and mixed with the first, second, and third mixers;

code to compute at least one monitoring signal value based, at least in part, upon the RF power input signal; and code to generate at least one monitoring signal value output.

20. The computer program product of claim 19, in which the medium further comprises code to generate at least one monitoring signal value output on at least one of an indicator lamp, a visual display panel, a network interface, a serial port interface, and an alarm signal interface.

* * * * *